United States Patent [19]

Rabl

[11] 3,991,740
[45] Nov. 16, 1976

[54] SEA SHELL SOLAR COLLECTOR

[75] Inventor: Ari Rabl, Downers Grove, Ill.

[73] Assignee: The United States of America as represented by the United States Energy Research and Development Administration, Washington, D.C.

[22] Filed: July 28, 1975

[21] Appl. No.: 599,442

[52] U.S. Cl. .............................. 126/270; 126/271
[51] Int. Cl.² ........................................... F24J 3/02
[58] Field of Search ............ 126/270, 271; 237/1 A; 350/288, 293, 294

[56] References Cited
UNITED STATES PATENTS

| 3,179,105 | 4/1965 | Falbel | 126/271 |
| 3,841,302 | 10/1974 | Falbel | 126/271 |
| 3,884,217 | 5/1975 | Wartes | 126/271 |
| 3,923,039 | 2/1975 | Falbel | 126/271 |

FOREIGN PATENTS OR APPLICATIONS

| 1,287,760 | 2/1962 | France | 126/270 |

Primary Examiner—Kenneth W. Sprague
Attorney, Agent, or Firm—Dean E. Carlson; Arthur A. Churm; Paul A. Gottlieb

[57] ABSTRACT

A device is provided for the collection and concentration of solar radiant energy including a longitudinally extending structure having a wall for directing radiant energy. The wall is parabolic with its focus along a line parallel to an extreme ray of the sun at one solstice and with its axis along a line parallel to an extreme ray of the sun at the other solstice. An energy absorber is positioned to receive the solar energy thereby collected.

5 Claims, 3 Drawing Figures

SEA SHELL SOLAR COLLECTOR

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

The present invention relates generally to the collection of radiant energy from solar sources. A particular type of solar collector is the cylindrical collector, which is formed by extending a transverse cross section longitudinally to form a trough-like structure, examples of which are described in a publication, *Solar Energy*, Vol. 16, No. 2, pages 89–85 (1974). Prior art cylindrical collectors generally possess uniform concentration for all angles of incidence of radiant energy. For heating and cooling applications, however, the load varies with the seasons, e.g. heating in winter and cooling in the summer. A solar collector with seasonably variable concentration would be advantageous if of simpler design than the collectors of uniform output now known.

It is therefore an object of this invention to provide a device for collecting and concentrating solar radiation.

Another object of this invention is to provide a nonimaging solar energy collection device with seasonably variable concentration.

SUMMARY OF THE INVENTION

A solar radiation collection device is provided having a seasonably, variable concentration. The device includes a first side wall for directing incident radiant energy. The first wall has a transverse cross section in the form of a parabola having its focus along a first line parallel to an extreme ray of the sun at one solstice and its axis parallel to an extreme ray of the sun at the other solstice. The parabola extends from a first point along the axis to no further than intersection with the first line. An energy absorber is so positioned to receive energy crossing an exit aperture between the first point and the focus. Convection loss from the absorber is limited by horizontal orientation of the absorber which is achieved by use of a second wall of circular cross section for directing radiant energy exiting the exit aperture onto the absorber whose surface is directed downward.

DETAILED DESCRIPTION OF THE PREFERRED EMBODIMENT

Figure 1:
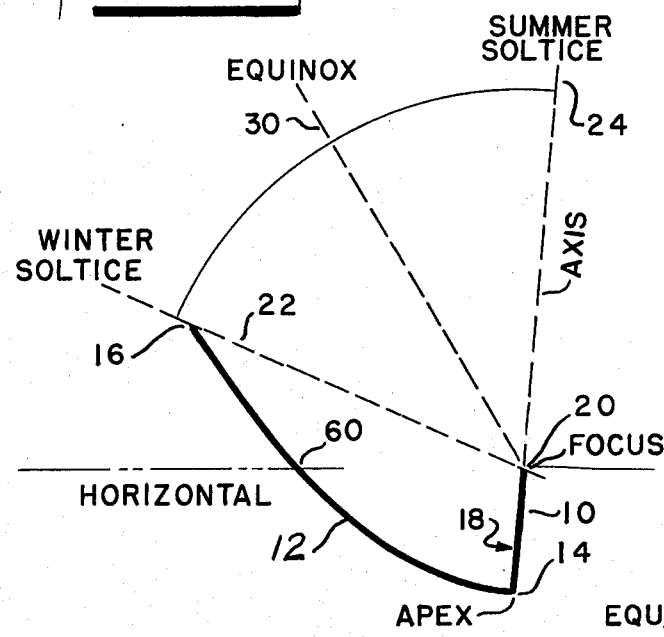
FIG. 1 shows a cross section of the solar collector for maximal summer output.
Figure 2:
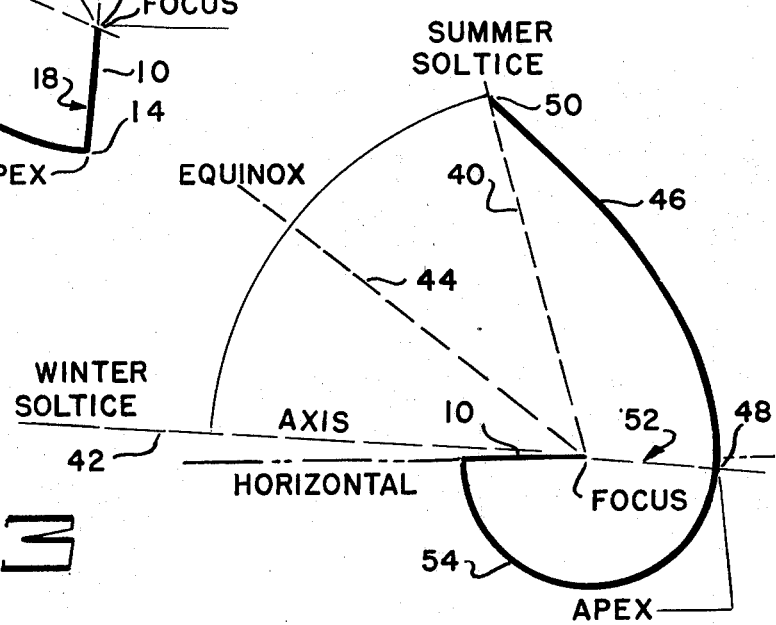
FIG. 2 shows a cross section of the solar collector for maximal winter output.

Referring to FIG. 1 and FIG. 2, there is shown a transverse cross section of two embodiments of the cylindrical solar energy concentration and collection device of this invention. As the disclosed device is a cylindrical collector, the physical structure of the collector is formed by extending the cross sections shown in FIG. 1 and FIG. 2 along an axis perpendicular to the plane of the cross section to form a trough-like structure, as will be described with reference to FIG. 3. The function of the collection device is to concentrate energy from the sun onto the surface of an energy absorber 10. The energy absorber may be for example, a pipe containing fluid, a photovoltaic cell, or any other type of energy receiver responsive to radiant energy.

The present disclosure relates to developing a collector having a concentrating side wall for reflecting energy incident thereon onto the energy absorber 10. In particular, the concentration factor of the collector, which is defined as the width of the entrance aperture divided by the width of the exit aperture, is to be seasonably variable, with either peak concentration in summer or peak concentration in winter, as desired. Referring to FIG. 1 there is shown a collector with peak concentration in summer. The collector includes a concentrating wall 12 which extends between points 14 and 16. Concentrating wall 12 directs energy incident thereon within particular angles, depending upon the time of year, out exit aperture 18. Wall 12 is parabolic in contour with its axis 24 parallel to an extreme ray of the sun at summer solstice. The wall extends between point 14 which is at the apex of the parabola and point 16 which is at the juncture of wall 12 and a line 22 parallel to an extreme ray of the sun at the winter solstice. The angular difference between lines 22 and 24 is about 72° ± 36° on either side of the line 30 parallel to a ray of the sun at equinox. This angular difference is generally constant regardless of location, however the angle between the equinox position, line 30, and the horizontal, parallel to the earth's surface, varies depending upon latitude. An extreme ray of the sun is one which is at the largest angle with respect to a ray of the sun at equinox, i.e., line 30, that a ray of the sun will make. This will occur twice on each solstice, in the morning and in the evening, when the same extreme angle with respect to equinox line 30 will be made by the extreme ray from the sun. The references to solstices and equinox are based on solar time, i.e., the actual equinox for a particular location.

The parabolic shape of reflecting wall 12, as herein described, will have a variable concentration with respect to energy exiting exit aperture 18. The concentration factor is a measure of the ratio between the width of the entrance aperture and the width of the exit aperture. The exit aperture out which energy is directed by wall 12 is between point 14, the apex of the parabola and focus 20 of the parabola which lies along the apex axis. The actual distance between points 20 and 16 is a matter of choice since all parabolas are concentric as all circles are concentric, differing only in size. Absorber 10 is positioned to extend from focus 20 to point 14. The entrance aperture is the opening of the collector within which rays of the sun are concentrated by the collector. In FIG. 1, as the sun moves from summer solstice to winter solstice, the entrance aperture decreases, being zero at winter solstice. As the sun moves from winter solstice to summer solstice the entrance aperture increases. The increase or decrease varies with the cosine of the angle of an axis through the entrance aperture and the position of the sun. Thus the concentration factor varies from zero in winter to 3.4 in summer without inclusion of the cosine factor which will depend on the latitude. Such a variable concentration would be ideal to drive absorption air conditioners with a minimum of equipment. Note that during any particular time of year the area of absorber 10 to which energy is directed by the collection device varies. At the extreme conditions, at solstices, the energy is concentrated on either end of absorber 10, while around equinox the energy is more equitably distributed.

Referring to FIG. 2, there is shown a collector having a variable concentration with peak concentration in winter. The summer solstice line 40, winter solstice line 42 and equinox line 44 are as described in FIG. 1 for lines 24, 22 and 30, respectively. However, in FIG. 2, the parabolic concentrating wall 46, which concentrates energy incident on the entrance aperture out the exit aperture, has its axis along the winter solstice line 42. The parabolic wall 46 extends from its apex point 48 along line 42, at point 48 and extends to line 40 at point 50. In this instance, the maximum output at exit aperture 52 between the focus on apex 42 and apex point 48 occurs at winter when the concentration factor is about 3.4 and minimum output is at summer when the concentration factor is about 0 without inclusion of the cosine factor.

The energy concentrated by the collectors shown in FIG. 1 and FIG. 2 is directed onto energy absorber 10. In FIG. 1 the energy absorber is shown positioned at and along exit aperture 18. In FIG. 2, the absorber is positioned with the surface of the absorber upon which energy is directed facing downward to minimize radiation loss which might otherwise occur if positioned at exit aperture 52. This is accomplished by providing an additional wall 54 for directing, without concentration or dispersion, energy exiting exit aperture 52 onto absorber 10. Wall 54 is circular having its center point at point 52 and being of radius equal to the width of the exit aperture 52. The circular wall and the downward facing absorber may of course be used in the embodiment shown in FIG. 1.

The seasonably variable nature of the concentration factor can be further changed by truncating the concentrating walls 12 and 46. For example, in FIG. 1, with truncation at point 60 along line 24, which is along the horizontal which intersects focus point 20, the concentration ranges from .7 to 1.7, with a mean value of 1.5 at equinox without inclusion of the cosine factor. Truncation or shortening of the concentration walls 12 and 54, presents a wider entrance aperture for some rays, such as at winter solstice in FIG. 1 and a shorter entrance aperture for other rays, such as its summer solstice in FIG. 1.

Figure 3:
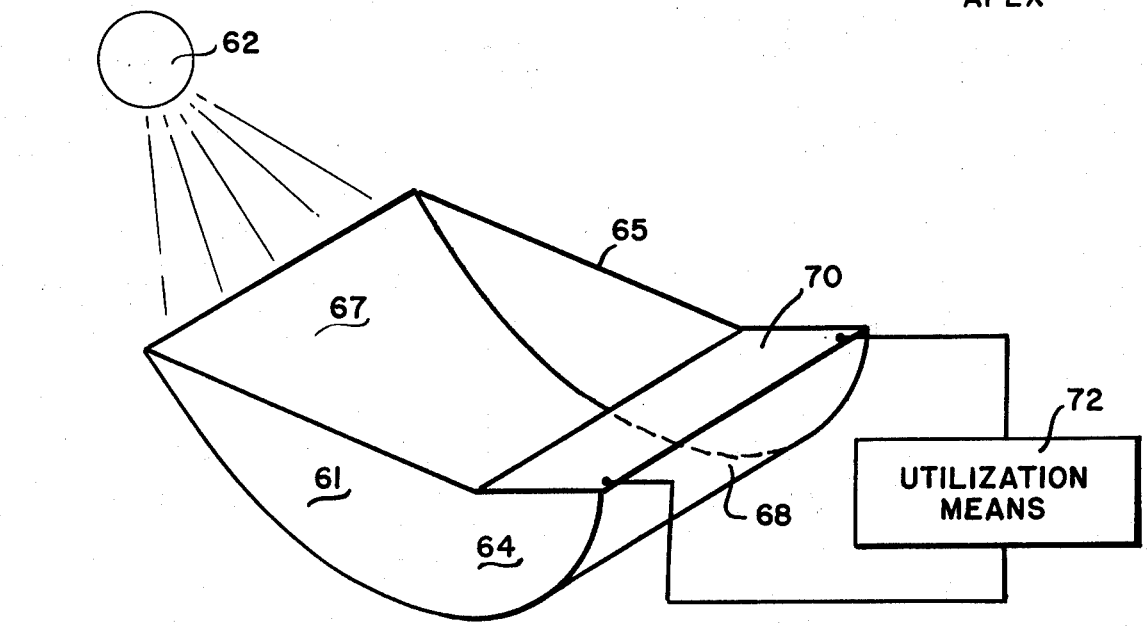
FIG. 3 shows the longitudinally extended structure of this invention.

An example of the practical application of the principles herein disclosed is shown in FIG. 3. Here one embodiment of collector 61 is shown concentrating energy from the sun 62. Collector 61 has a transverse cross section which is extended along an axis perpendicular to the cross section to form a trough-like cylindrical collector. Flat reflective end wall 64 and 65 fully enclose the collector 61. Concentrating wall 67 whose contour is generated as described with reference to FIG. 1 or FIG. 2, and side walls 64 and 65 have a reflective material thereon which reflects substantially all of the solar energy incident thereon from the sun 62, as for example, aluminum or silver. The reflected energy is directed by additional circular wall 68 onto downward facing absorber 70. Connections are provided to absorber 70 to allow utilization of the energy absorbed by absorber 70 by utilization means 72.

The embodiments of the invention in which an exclusive property or privilege is claimed are defined as follows:

1. A stationary nonimaging cylindrical solar radiation concentration device, having a seasonably variable concentration factor comprising:
   a reflective side wall for directing radiant energy with a transverse cross section in the form of a parabola whose axis is a first line parallel to an extreme ray of the sun at one of the solstices, said parabola extending from the apex of said parabola along said first line to a second line parallel to an extreme ray of the sun at the other solstice, and an energy absorber positioned to receive solar energy crossing an exit aperture whose transverse cross section is defined by a third line from the focus of said parabola to said apex of said parabola, said energy absorber and said side wall extending parallel to a reference axis perpendicular to the transverse cross section of said side wall to form a trough-shaped structure.

2. The device of claim 1 wherein said first line is parallel to an extreme ray of the sun at winter solstice and said second line is parallel to an extreme ray of the sun at summer solstice thereby giving the device maximal concentration in winter.

3. The device of claim 1 wherein said first line is parallel to an extreme ray of the sun at summer solstice and said second line is parallel to an extreme ray of the sun at winter solstice thereby giving the device maximal concentration in winter.

4. The device of claim 1 further including a circular reflective wall for directing energy exiting said exit aperture onto said absorber having a circular transverse cross section whose center is at said focus and whose radius is equal in length to said third line, said circular cross section extends from said apex, is positioned on the opposite side of said third line from said side wall, said absorber being positioned along a second radius of said circular reflective wall such that the surface of said absorber upon which energy is directed faces downward toward the earth's surface thereby reducing convective heat loss therefrom.

5. The device of claim 1 wherein the cross section of said absorber extends along said third line from said apex to said focus.

* * * * *